United States Patent
Rouleau

(10) Patent No.: US 7,088,013 B2
(45) Date of Patent: Aug. 8, 2006

(54) ALGORITHM FOR ELECTRIC COLUMN LOCK

(75) Inventor: James Edward Rouleau, Burt, MI (US)

(73) Assignee: Delphi Technologies, Inc., Troy, MI (US)

( * ) Notice: Subject to any disclaimer, the term of this patent is extended or adjusted under 35 U.S.C. 154(b) by 486 days.

(21) Appl. No.: 10/356,911

(22) Filed: Feb. 3, 2003

(65) Prior Publication Data
US 2004/0160125 A1    Aug. 19, 2004

(51) Int. Cl.
B60R 25/00    (2006.01)

(52) U.S. Cl. ................................... 307/10.2

(58) Field of Classification Search ............. 307/9.1, 307/10.2; 340/425.5; 180/287, 233, 197
See application file for complete search history.

(56) References Cited

U.S. PATENT DOCUMENTS

| 6,419,269 B1 | 7/2002 | Manwaring et al. ........ 280/775 |
| 6,571,587 B1 * | 6/2003 | Dimig et al. ................. 70/186 |
| 6,616,185 B1 | 9/2003 | Manwaring et al. ........ 280/775 |
| 6,857,496 B1 * | 2/2005 | Williams .................... 180/287 |

FOREIGN PATENT DOCUMENTS

| DE | 19736651 | 8/1999 |
| DE | 10016487 | 10/2001 |

* cited by examiner

*Primary Examiner*—Brian Sircus
*Assistant Examiner*—Luis Roman
(74) *Attorney, Agent, or Firm*—Michael D. Smith

(57) ABSTRACT

A method for unlocking a steering system that includes detecting and validating an identity input. After the identity input is validated a vehicle start command is detected and thereafter a steering assist mechanism is enabled. Once the steering assist mechanism is enabled, a force is applied to a steering column utilizing the steering assist mechanism. Following an application of the force by the steering assist mechanism, the steering system is unlocked by an unlocking mechanism. After unlocking of the steering system, a vehicle may then be started. The application of the force to the steering column may be alternating application of a clockwise and counterclockwise torque or may be a directional torque applied to the steering column based on a measured steering characteristic.

18 Claims, 5 Drawing Sheets

ALGORITHM FOR ELECTRIC COLUMN LOCK

TECHNICAL FIELD

The invention generally relates to a method for unlocking a steering column system, and more particularly, to a method for unlocking a steering column system that applies a force to a steering column using a steering assist mechanism prior to unlocking the steering system.

BACKGROUND OF THE INVENTION

Steering columns are known in the art to contain locking mechanisms to prevent the theft of a motor vehicle. Generally, these steering column locks may include a locking member that moves from unlocked to locked positions via means of an electric drive mechanism. The lock member typically engages a recess formed on a steering column thus blocking movement of the steering column.

The electric drive mechanisms typically comprise relatively large electric motors capable of producing forces required to unlock columns with residual torque up to 50 newtons meters. Such large forces are necessary to overcome torque that may be placed on a steering lock mechanism. Therefore, the electric drive mechanisms associated with such systems are generally large and occupy a significant amount of space within a steering column region of a motor vehicle.

There is, therefore, a need to reduce the size of an unlocking drive mechanism to provide a cost savings as to the lighter weight of the mechanism as well as to provide increased area around a steering column of a motor vehicle. Therefore, a method for unlocking a steering system that includes decreasing the amount of torque applied to an unlocking mechanism and thereafter unlocking the steering system would be desirable.

SUMMARY OF THE INVENTION

A method for unlocking a steering system including the steps of detecting an identity input, validating the identity input, detecting a vehicle start command, enabling a steering assist mechanism, applying a force to a steering column utilizing the steering assist mechanism, unlocking the steering system, and thereafter starting the vehicle. The steering assist mechanism reduces a torque on the steering column allowing an unlocking mechanism of reduced size and force capacity.

In an alternative method of the present invention, a steering characteristic is measured prior to applying a force to the steering column utilizing the steering assist mechanism. The amount of force, as well as the direction of the force applied to the steering column is based upon a magnitude and direction of the measured steering characteristic.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 3:
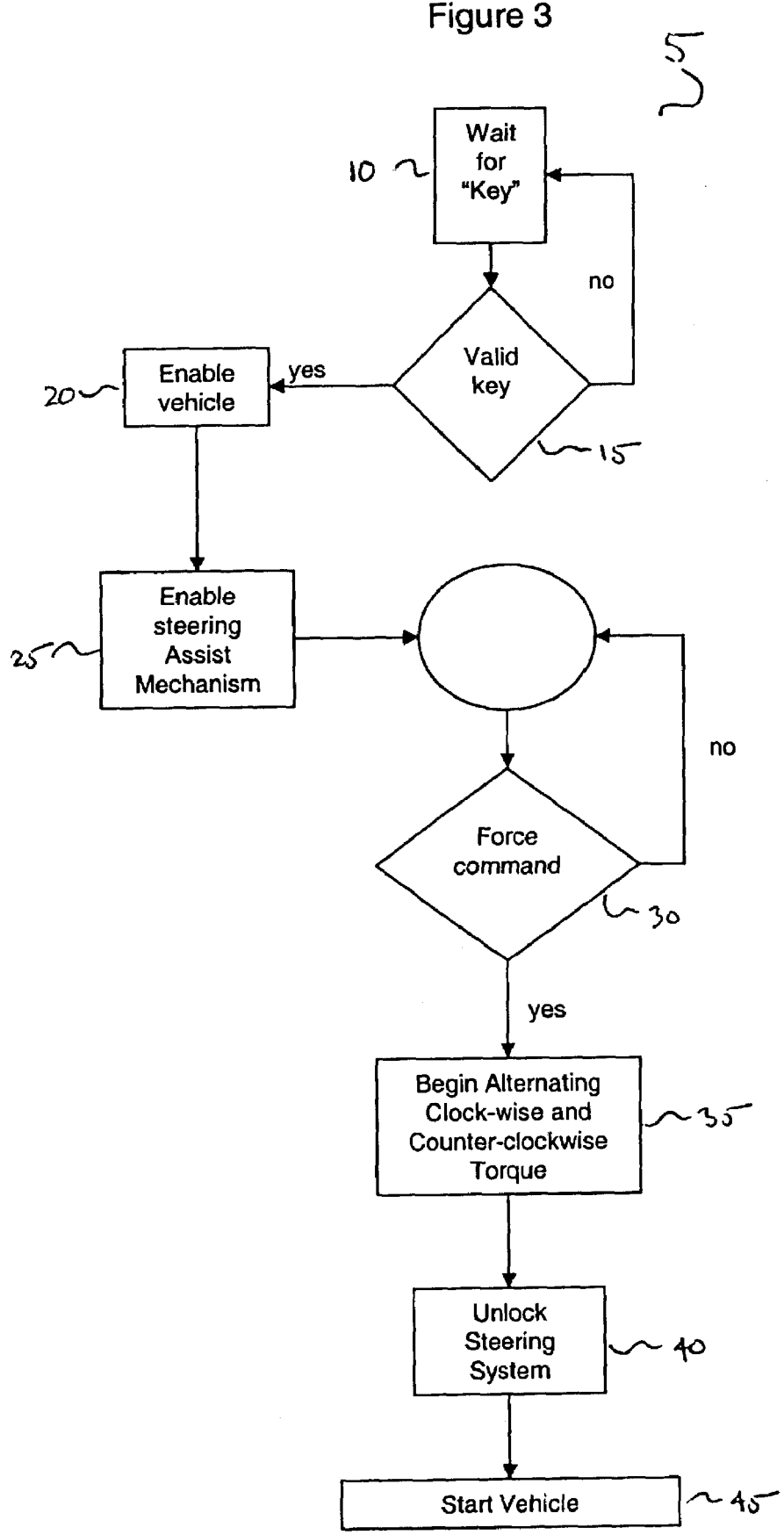
FIG. 3 is a flow diagram detailing the steps of a first embodiment of the method for unlocking a steering system.

Referring to FIG. 3, there is shown a first embodiment 5 of the method for unlocking a steering system of the present invention. The method 5 includes the steps of: detecting an identity input 10, validating the identity input 15, detecting a vehicle start command 20, enabling a steering assist mechanism 25, applying a force to a steering column utilizing the steering assist mechanism 35, unlocking the steering system 40, and starting a vehicle 45.

With reference to the step detecting an identity input 10 and validating the identity input 15, it is to be understood that there are a variety of identity inputs or keys that may be utilized by the present invention. For example, an identity input may comprise keyless entry input, such as a signal generated when a button on a key fob is depressed to unlock the doors. Other keyless entry input such as a smart chip disposed within a key to identify the holder of the key as an authorized user of a vehicle may also be utilized. Other identity inputs include key actuation input in a door or ignition allowing a user to unlock a door or turn a key within an ignition switch. Alternatively, code input entered on a keypad, commonly disposed on a motor vehicle can comprise the identity input of the present invention. The act of opening or closing a door actuation input can also be utilized by the present invention as an identity input. It is to be understood that a variety of identity inputs may be utilized by the present invention without departing from the inventive aspect. For example, biometric characteristics such as fingerprint data, retinal scans, face recognition scans, or other such biometric data can be utilized by the present invention. Regardless of the identity input utilized by the present invention, once the input is validated by an appropriate mechanism the vehicle is enabled such that it is capable of receiving a start command. Such a start command may be the insertion of a key within an ignition mechanism and thereafter turning the key in a conventional manner to start a vehicle. The step of enabling the vehicle is depicted as 20 in FIG. 3 of the first embodiment.

After the vehicle has been enabled, as shown in step 20 of FIG. 3, a steering assist mechanism is enabled as demonstrated in step 25 of FIG. 3. Various steering assist mechanisms are contemplated for use by the method of the present invention. Actuators include electric, hydraulic, pneumatic, electro-hydraulic, and electro-pneumatic actuators as are commonly utilized in the art. Preferably, electric actuators such as that generally found in an electric power steering mechanism may be utilized by the present invention. Typically, such electric actuators comprise electric motors and have a torque range of from 0 to 50 newton meters.

Once the steering assist mechanism is enabled as in block 25, an appropriate control or processing unit transmits a force command as represented in block 30, authorizing applying a force to the steering column utilizing the steering assist mechanism.

With respect to the first embodiment depicted in FIG. 3, an alternating clockwise and counterclockwise torque is applied to the steering column, thereby lessening any stored torque in the steering system. In this manner, the amount of force needed for an unlocking mechanism is reduced.

After application of a force to the steering column by the steering assist mechanism, as depicted in block 35, the steering system is unlocked as depicted in block 40 by an unlocking mechanism. The unlocking mechanism may comprise actuators similar to that of the steering assist mechanism and include electric, hydraulic, pneumatic, electro-hydraulic and electro-pneumatic actuators. Preferably, an electric actuator, such as an electric motor is utilized by the present invention. The unlocking mechanism is smaller in size and force capacity compared to those commonly utilized in the art. In a preferred aspect of the invention, the unlocking mechanism has a torque capability of preferably less than 20 newton meters. With motors of this size and capacity, there is a cost savings and the area occupied by the column lock actuator is decreased.

Figure 1:
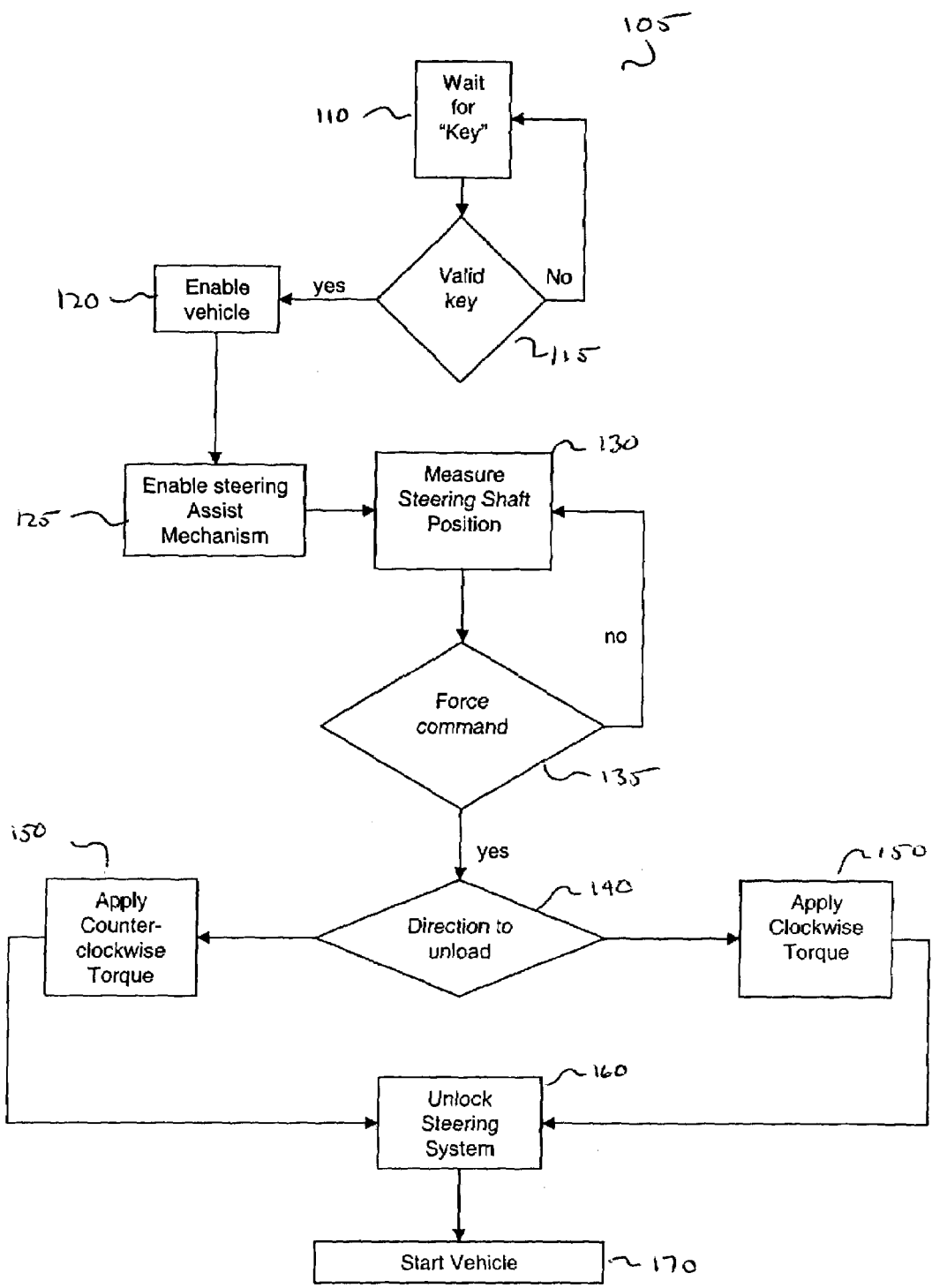
FIG. 1 is a flow diagram detailing the steps of a second embodiment of a method for unlocking a steering system.

With reference to FIG. 1, there is shown a second embodiment of the method for unlocking a steering system of the present invention. The method 105 includes the same preliminary steps, as stated in the first embodiment including step 110 detecting an identity input, step 115 validity the identity input, step 120 enabling the vehicle, and step 125 enabling a steering assist mechanism. The various inputs and the steering assist mechanisms are the same as that of the first embodiment and are therefore not repeated. Following the step 125 of enabling the steering mechanism, a steering characteristic is measured in step 130 prior to applying a force to the steering column. The steering characteristic depicted in FIG. 1 in block 130 is the measurement of a steering shaft position. The position is preferably measured as a distance from center, as is commonly utilized in the art. Appropriate sensors associated with the steering shaft can measure the position in terms of the amount or distance from center, as well as the direction from center. In step 135 of FIG. 1, a force command similar to that depicted in block 30 of FIG. 3 initiates the application of a force or torque by a steering assist mechanism. Following the force command block 135, there is a directional computation block 140 that determines the direction to unload a stored torque on the steering column. Based on the measurement of the steering shaft position and the direction of the steering shaft from the center, either a counterclockwise or clockwise torque, displayed in blocks 150, is applied to the steering shaft. As with the previous embodiment, after application of the clockwise or counterclockwise torque, dependent on the direction of the torque stored on the shaft, an unlocking mechanism, as discussed in the previous first embodiment is utilized to unlock a steering system in block 160. Following unlocking of the steering system, as displayed in block 160, the vehicle may then be started as displayed in block 170.

Figure 2:
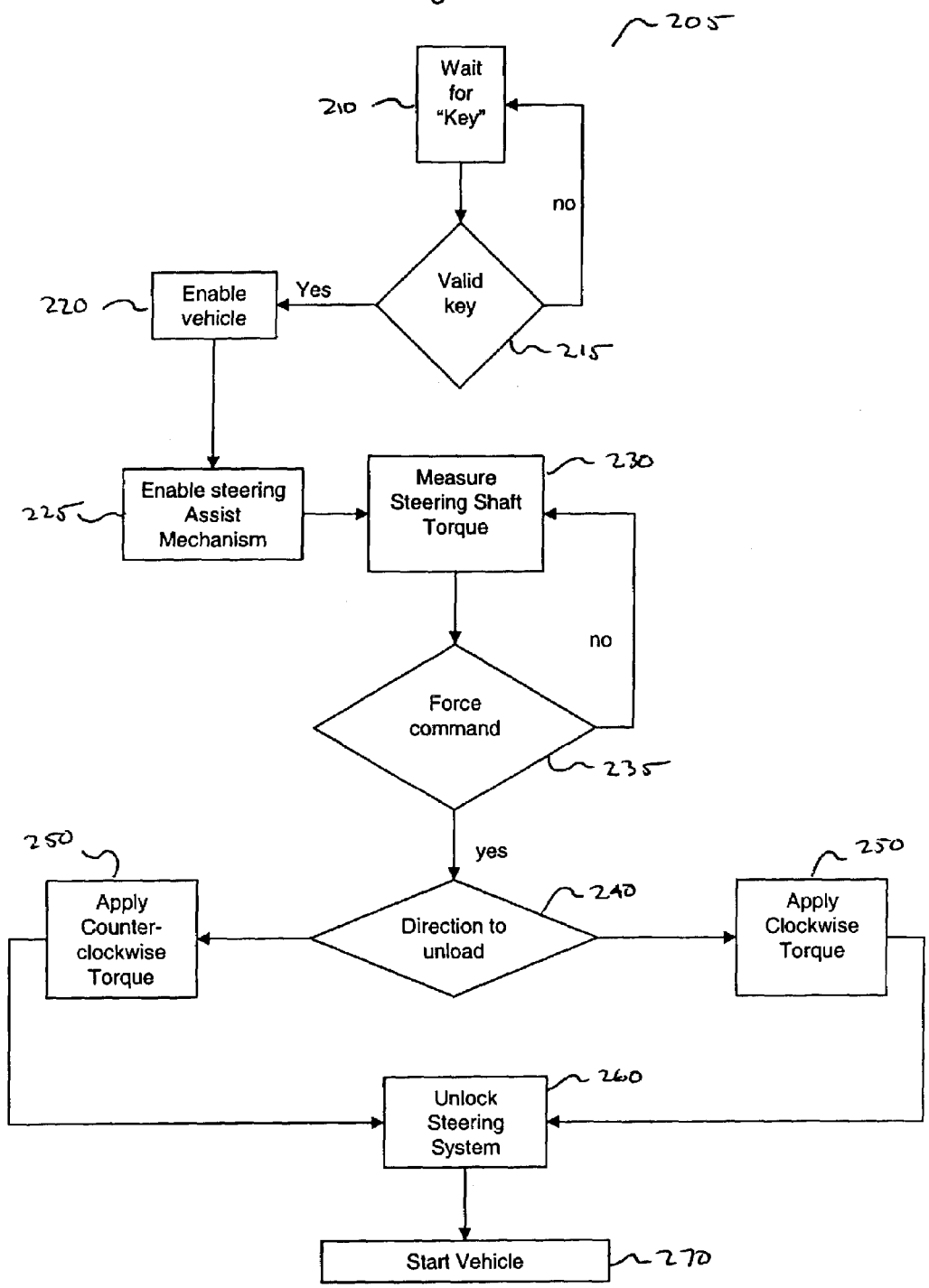
FIG. 2 is a flow diagram detailing the steps of a third embodiment of the method for unlocking a steering system.

With respect to FIG. 2, there is shown a third embodiment 205 of the method for unlocking a steering system of the present invention. The method 205 of the third embodiment is identical to that of the second embodiment except that the measured steering characteristic is the measurement of a steering shaft torque. The steering shaft torque can be measured by a torque sensor positioned between the wheels and the steering shaft of a vehicle. Dependent upon a magnitude, as well as a direction of the torque determined by the sensor, application of a counterclockwise or clockwise torque is similarly applied in the third embodiment and is depicted at blocks 250. Similarly, after application of either the clockwise or counterclockwise torque in block 250, an unlocking mechanism, as previously described, unlocks the steering system as depicted in block 260 after which a vehicle may be started as depicted in block 270.

Figure 4:
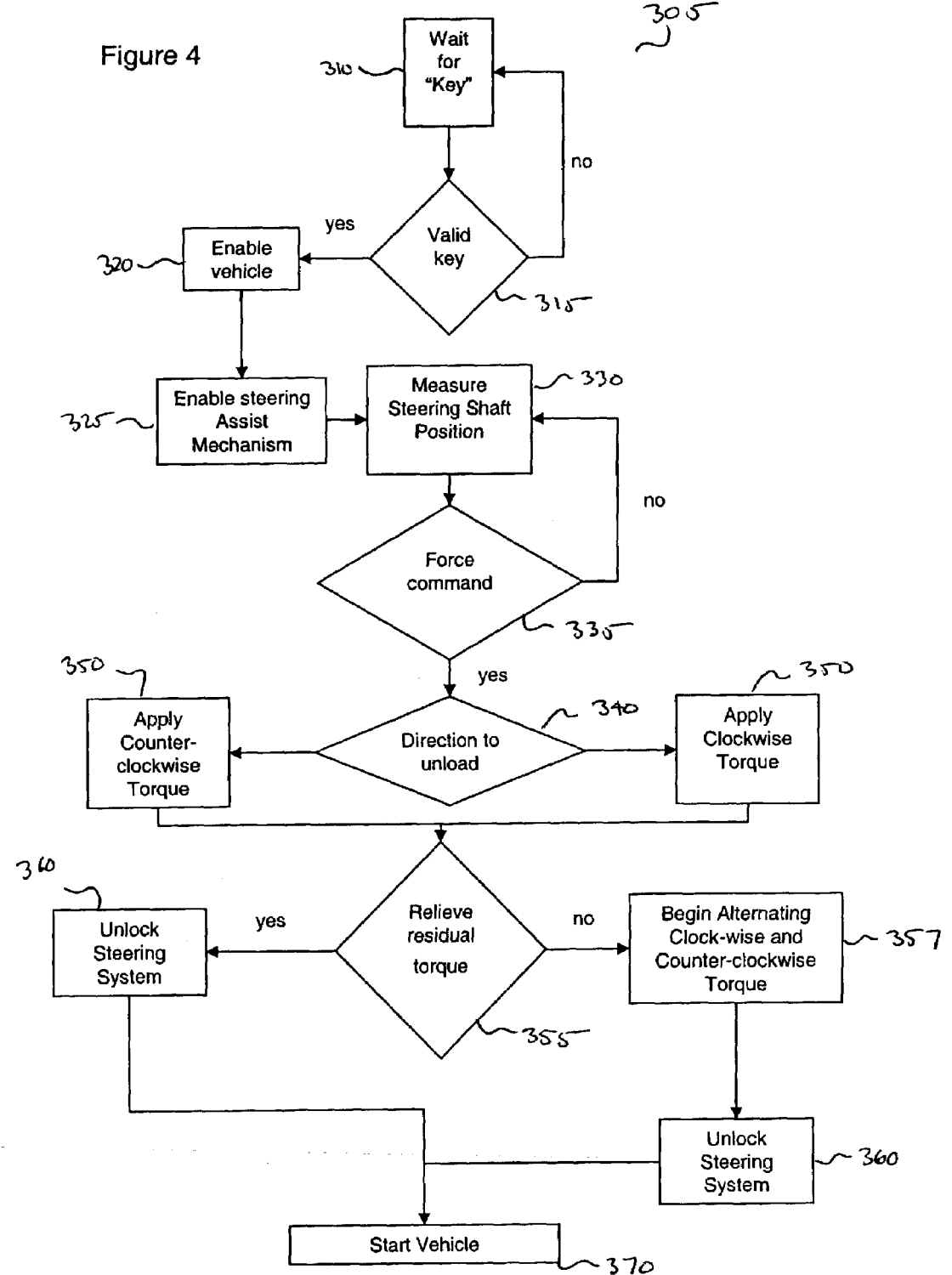
FIG. 4 is a flow diagram detailing the steps of a fourth embodiment of the method for unlocking a steering system.
Figure 5:
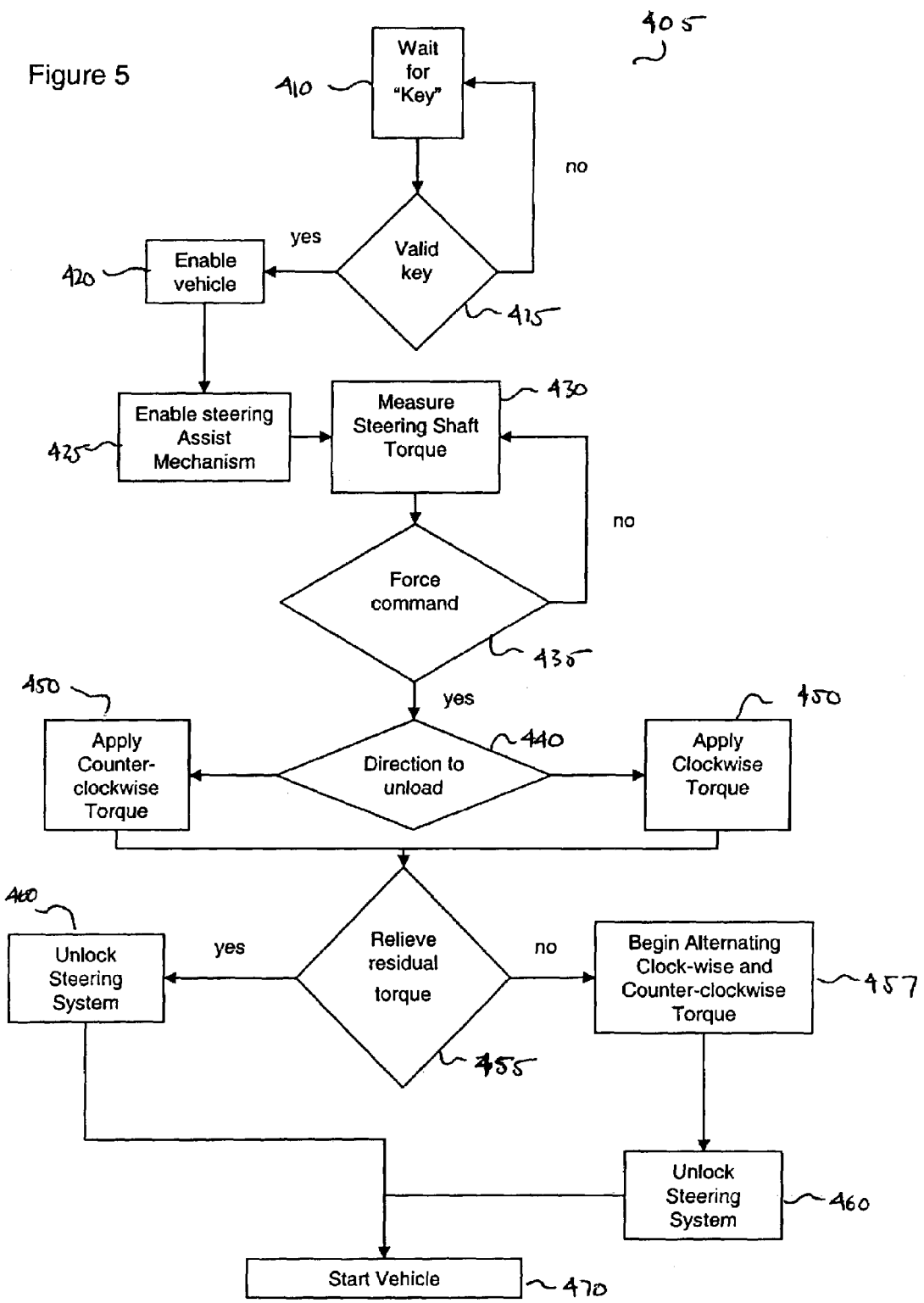
FIG. 5 is a flow diagram detailing the steps of a fifth embodiment of the method for unlocking a steering system.

With reference to FIGS. 4 and 5, there are depicted fourth and fifth embodiments of the method as depicted in blocks 305 and 405 of FIGS. 4 and 5 respectively. The methods depicted in FIGS. 4 and 5 are similar with the exception being the type of steering characteristic measured. In FIG. 4, the steering characteristic measured is the steering shaft position, while in FIG. 5, the steering shaft torque is measured. Therefore, only the embodiment disclosed in FIG. 4 will be discussed in detail to avoid unnecessary repetition.

With reference to FIG. 4, the method 305 includes blocks 310 through blocks 350 that correspond exactly to blocks 110 through 150 of FIG. 1. As with the embodiment disclosed in FIG. 1, a steering shaft position is measured prior to application of a clockwise or counterclockwise torque as depicted in blocks 150 and 350. Following the application of the torque of block 350, there is detailed in FIG. 4, block 355, to determine whether a residual torque is relieved from the steering system. In block 355, it is determined whether sufficient torque has been removed from the system to allow for the unlocking mechanism, as described with reference to the previous embodiments to unlock the steering mechanism. If the residual torque has been removed from the steering system sufficient to allow unlocking of the steering system, then the steering system is unlocked as depicted in block 360. However, should the residual torque applied to the steering system be greater than a force necessary to unlock the steering system by an unlocking mechanism, an alternating clockwise and a counterclockwise torque is applied as depicted in block 357. The application of the alternating clockwise and counterclockwise torque is similar to that of the method of the first embodiment as displayed in FIG. 3. Therefore, the method of applying an alternating clockwise and counterclockwise torque as displayed in FIG. 3 is a fallback or contingent force applied to the steering column should the residual torque not be relieved by application of the force in blocks 350. After application of the alternating clockwise and counterclockwise torque as displayed in block 357, the steering system may be unlocked as displayed in block 360, after which the vehicle may be started as displayed in block 370. As stated above, with reference to FIG. 5, the method is the same as that described in FIG. 4 with the exception that the measured steering characteristic in FIG. 5 is a measurement of a steering shaft torque displayed in block 430 as opposed to the measurement of the steering shaft position displayed in block 330 of FIG. 4.

While preferred embodiments are disclosed, a worker in this art would understand that various modifications would come within the scope of the invention. Thus, the following claims should be studied to determine the scope and content of the invention.

The invention claimed is:
1. A method for unlocking a steering system comprising the steps of:
  locking a steering column with a mechanical lock at an interface;
  detecting an identity input;
  validating the identity input;
  detecting a vehicle start command;
  enabling a steering assist mechanism;
  applying a force to the steering column utilizing the steering assist mechanism to reduce forces at the interface;
  unlocking the steering system after the reduction in forces of the interface; and
  starting the vehicle.

2. The method of claim 1 wherein the step of applying a force to the steering column comprises applying an alternating clockwise and counter-clockwise torque to the steering column.

3. The method of claim 1 wherein the steering assist mechanism comprises an actuator selected from the group consisting of: electric, hydraulic, pneumatic, electro-hydraulic, and electro-pneumatic actuators.

4. The method of claim 3 wherein the steering assist mechanism comprises an electric power steering actuator.

5. The method of claim 1 wherein the step of detecting an identity input comprises detecting an input selected from the group consisting of:
keyless entry input, key actuation input in a door, key actuation input in an ignition, code input entered on a keypad, and door actuation input.

6. The method of claim 1 further including the step of measuring a steering characteristic prior to applying a force to the steering column.

7. The method of claim 6 wherein the force is applied to the steering column based on the measured steering characteristic.

8. The method of claim 6 wherein the measured steering characteristic comprises a steering shaft torque.

9. The method of claim 8 wherein a force is applied to the steering column in a direction according to the measured torque on the steering column.

10. The method of claim 9 wherein the force applied to the steering column does not relieve a residual torque on the steering column to allow unlocking the steering system.

11. The method of claim 10 wherein an alternating clockwise and counter-clockwise torque is applied to the steering column prior to unlocking the steering system.

12. The method of claim 6 wherein the measure steering characteristic comprises a steering shaft position.

13. The method of claim 12 wherein a force is applied to the steering column in a direction according to the measured steering shaft position.

14. The method of claim 13 wherein the force applied to the steering column does not relieve a residual torque on the steering column to allow unlocking the steering system.

15. The method of claim 14 wherein an alternating clockwise and counter-clockwise torque is applied to the steering column prior to unlocking the steering system.

16. A method for unlocking a steering system comprising the steps of:
locking a steering column with a mechanical lock at an interface;
detecting an identity input;
validating the identity input;
detecting a vehicle start command;
measuring a steering characteristic;
applying a force to the steering column utilizing the steering assist mechanism based on the measured steering characteristic to reduce forces at the interface;
unlocking the steering system after the reduction in forces at the interface; and
starting the vehicle.

17. A method for unlocking a steering system comprising the steps of:
locking a steering column with a mechanical lock at an interface;
detecting an identity input;
validating the identity input;
detecting a vehicle start command;
measuring a steering characteristic;
applying a force to the steering column utilizing the steering assist mechanism based on the measured steering characteristic to reduce residual torque on the steering column;
determining if the residual torque on the steering column has been relieved;
applying an alternating clockwise and counter-clockwise torque to the steering column;
unlocking the steering system after a reduction in the torque residual; and
starting the vehicle.

18. A steering system comprising:
a steering column;
a mechanical lock movable between an unlocked position to a locked position for locking the steering column at an interface;
a steering assist mechanism for reducing the forces of the interface of said mechanical lock; and
a sensor for determining the forces at the interface of said mechanical lock and providing a signal to move said mechanical lock to said unlocked position in response to a reduction in the forces of the interface.

* * * * *